US010068143B2

(12) United States Patent
Niem

(10) Patent No.: US 10,068,143 B2
(45) Date of Patent: Sep. 4, 2018

(54) METHOD FOR CALIBRATING A CAMERA FOR A GAZE DIRECTION DETECTION IN A VEHICLE, DEVICE FOR A MOTOR VEHICLE HAVING A CAMERA AND AT LEAST ONE FURTHER ELEMENT, AND COMPUTER PROGRAM PRODUCT

(71) Applicant: Robert Bosch GmbH, Stuttgart (DE)

(72) Inventor: Wolfgang Niem, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 159 days.

(21) Appl. No.: 15/055,608

(22) Filed: Feb. 28, 2016

(65) Prior Publication Data
US 2016/0267336 A1    Sep. 15, 2016

(30) Foreign Application Priority Data

Mar. 10, 2015    (DE) .................. 10 2015 204 281

(51) Int. Cl.
*H04N 5/232*    (2006.01)
*G06K 9/00*    (2006.01)
(Continued)

(52) U.S. Cl.
CPC ......... *G06K 9/00845* (2013.01); *B60W 40/08* (2013.01); *G06F 3/012* (2013.01);
(Continued)

(58) Field of Classification Search
CPC ........... B60W 2040/0872; B60W 40/08; G06F 3/012; G06F 3/013; G06K 9/00597;
(Continued)

(56) References Cited

U.S. PATENT DOCUMENTS

| 8,510,166 B2 * | 8/2013 | Neven ............. A61B 3/113 |
| | | 705/14.68 |
| 8,736,701 B2 * | 5/2014 | Marman ............ H04N 5/772 |
| | | 348/143 |

(Continued)

FOREIGN PATENT DOCUMENTS

DE    102005047160    4/2007

OTHER PUBLICATIONS

Vicente et al, Driver gaze tracking and eyes off the road detection system, Aug. 2015.*

(Continued)

*Primary Examiner* — Shan E Elahi
(74) *Attorney, Agent, or Firm* — Norton Rose Fulbright US LLP; Gerard Messina

(57) ABSTRACT

A method for calibrating a camera for a gaze direction detection in a vehicle, to a device for a motor vehicle having a camera and at least one further element, and to a computer program product. The at least one further element is situated in a fixed geometric relationship with the camera the calibration takes place by detecting, in images of the camera, at least one relative change in the gaze direction in which a user changes his gaze in the direction of the further element. The method is characterized in that it is detected by at least one action of the user that the gaze change of the user has taken place or will take place. For the gaze direction then offers an advantage as a result of a dual benefit: it is used both for the calibration and for the action of the user.

9 Claims, 1 Drawing Sheet

(51) Int. Cl.
*G06F 3/01* (2006.01)
*B60W 40/08* (2012.01)
*G06T 7/80* (2017.01)

(52) U.S. Cl.
CPC ......... *G06F 3/013* (2013.01); *G06K 9/00597* (2013.01); *G06T 7/80* (2017.01); *B60W 2040/0872* (2013.01); *G06T 2207/30201* (2013.01); *G06T 2207/30268* (2013.01)

(58) Field of Classification Search
CPC ...... G06K 9/00845; G06T 2207/30201; G06T 2207/30268; G06T 7/80
USPC .......................................................... 348/78
See application file for complete search history.

(56) References Cited

U.S. PATENT DOCUMENTS

| | | | | |
|---|---|---|---|---|
| 8,982,046 | B2* | 3/2015 | Edwards | A61B 3/113 345/156 |
| 9,405,982 | B2* | 8/2016 | Zhang | G06K 9/00597 |
| 2009/0304232 | A1* | 12/2009 | Tsukizawa | A61B 3/113 382/103 |
| 2012/0162603 | A1* | 6/2012 | Dejima | A61B 3/113 351/209 |
| 2012/0290401 | A1* | 11/2012 | Neven | A61B 3/113 705/14.68 |
| 2013/0128052 | A1* | 5/2013 | Catrein | H04N 5/232 348/159 |
| 2013/0212507 | A1* | 8/2013 | Fedoseyeva | G06Q 10/00 715/765 |
| 2014/0139655 | A1* | 5/2014 | Mimar | G08B 21/06 348/77 |
| 2014/0204193 | A1* | 7/2014 | Zhang | G06K 9/00597 348/78 |
| 2016/0140733 | A1* | 5/2016 | Gu | H04N 13/0062 348/43 |
| 2016/0210503 | A1* | 7/2016 | Yin | G06F 3/00 |
| 2016/0272215 | A1* | 9/2016 | Laine | B60W 50/14 |
| 2017/0123526 | A1* | 5/2017 | Trail | G06F 3/041 |

OTHER PUBLICATIONS

Sugimoto et al, Detecting a gazing region by visual direction and stereo cameras, 2002.*

Choi et al, Real-time categorization of driver's gaze zone using the deep learning techniques, 2016.*

Jafari et al, Gaze Estimation Using Kinect/PTZ Camera (Year: 2012).*

Yun et al, Video based detection and analysis of driver distraction and inattention (Year: 2014).*

Kohlbecher et al., Calibration-Free Eye Tracking by Reconstruction of the Pupil Ellipse in 3-D Space, ETRA '08, pp. 135-138, 2008.

* cited by examiner

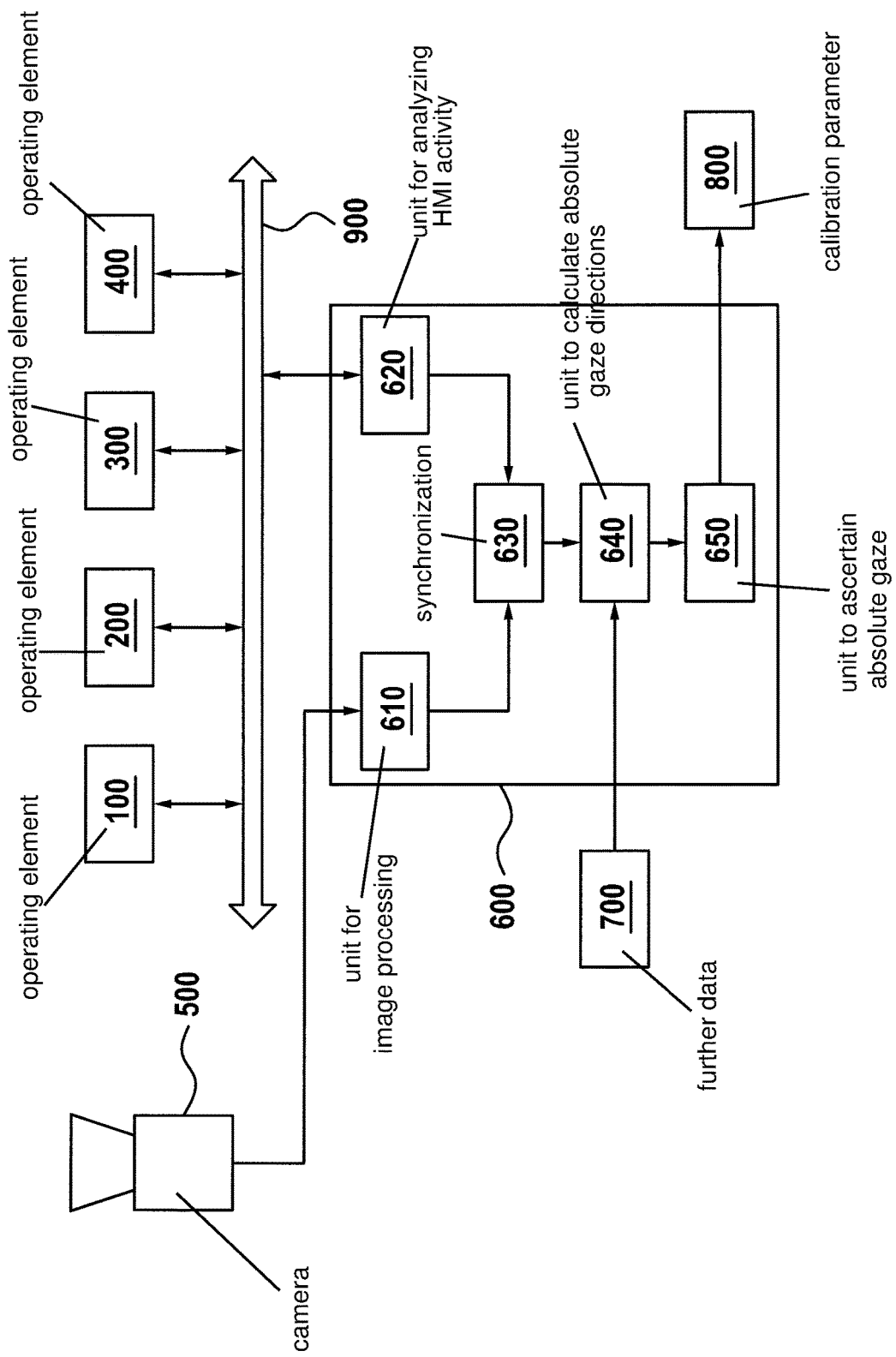

METHOD FOR CALIBRATING A CAMERA FOR A GAZE DIRECTION DETECTION IN A VEHICLE, DEVICE FOR A MOTOR VEHICLE HAVING A CAMERA AND AT LEAST ONE FURTHER ELEMENT, AND COMPUTER PROGRAM PRODUCT

CROSS REFERENCE

This application claims the benefit of German Patent Application No. 102015204281.2 filed Mar. 10, 2015, which is expressly incorporated herein by reference in its entirety.

FIELD

The present invention relates to a method for calibrating a camera for a gaze direction detection in a vehicle, a device for a motor vehicle having a camera and at least one further element, and a computer program product. The at least one further element is situated in a fixed geometric relationship with the camera.

BACKGROUND INFORMATION

Vehicles and other application scenarios use cameras which are placed in such a way that they are able to detect the head and eyes of a user, such as a driver of the vehicle. The basic positioning of the camera makes it possible to ascertain a gaze direction of the user. However, an absolute determination of the gaze direction with the aid of only a single camera requires a prior calibration of the camera and the gaze direction detection.

For example, the camera is calibrated using what is known as an end of line calibration (EOL calibration).

German Patent Application No. DE 10 2005 047160 uses an ellipsis identification for ascertaining the gaze direction. An exact position of the elliptical image of the circular pupilla can be utilized for inferring the position of the eye, and from that, the gaze direction of a user.

In 'Calibration-Free Eye Tracking by Reconstruction of the Pupil Ellipse in 3-D Space, ETRA'08, 2008', S. Kohlbecher et al. describe a stereo-based method without calibration.

Another calibration possibility consists of letting the user interact with the further element in that, for instance, the user is asked to track markers on a screen with his eyes, the marker's spatial positioning in relation to the camera being known and basically non-variable.

Each change in position of the marker on the screen results in a change in the viewer's gaze direction, which is ascertainable in camera images, at least in relative terms. The change in position of the marker, the fixed spatial-geometric relationship of the screen to the camera, and the detected relative change in the gaze direction in turn make it possible to ascertain an absolute gaze direction, possibly with the aid of camera parameters of the camera.

The use of multiple absolute gaze directions thereby makes it possible to achieve a stable calibration of the gaze direction detection.

SUMMARY

In accordance with the present invention, the calibration can be improved through an interaction with a further element if the required change in the viewer's gaze direction is able to be carried out within the scope of an action of the user that he performs anyway.

The present invention relates to a method for calibrating a camera for detecting an absolute gaze direction in a vehicle. At least one further element is situated in a fixed spatial-geometric relationship with the camera. The calibration is performed by detecting at least one relative change in the gaze direction, in which a user changes his gaze in the direction of the further element, in images of the camera. An example method is characterized by the fact that it is detected based on at least by action of the user that the relative gaze direction change of the user has taken place or will take place.

In that case, the change in gaze produces an advantage as a result of a dual benefit: it is used both for the calibration and for the action of the user.

In one preferred specific embodiment, the method may encompass an ascertainment of the absolute gaze direction using the relative change in the gaze direction and the fixed spatial-geometric relationship.

This improves the calibration.

Camera parameters of the camera from an end-of-line calibration may be used for ascertaining the absolute gaze direction.

This further improves the calibration.

Multiple absolute gaze directions can be ascertained, which are then utilized for calibrating the gaze direction detection.

This improves the calibration even further.

The calibration may include an ascertaining of a head position and an eye position in an image recorded by the camera, and the ascertaining of the relative change in the gaze direction based on the ascertained head position and the ascertained eye position.

This makes it easy to ascertain the relative change in the gaze direction.

The further element, for example, may include a radio, an automotive navigation system, and/or an air-conditioning system, and the action an operation of a pushbutton, a touch pad and/or a touch screen.

The fact that the gaze direction has changed then is easy to detect.

The further element may also include a rear view mirror and/or a screen, and the action can include a driving maneuver.

The method may encompass a synchronization of a video time stamp of the camera with an operating and/or display event of the further element that triggers the action or that is triggered by it.

This makes it easier to detect the relative change in the gaze direction in the images.

According to the present invention, an example device for a motor vehicle having a camera and at least one further element is furthermore introduced. This further element is situated in a fixed spatial-geometric relationship to the camera, the device being set up for executing the steps of the method introduced by the present invention.

Finally, an example computer program product is provided. The computer program product includes program code which can be executed by a computer in order to implement the method of the present invention when the program is running on a control device of a vehicle, the vehicle including a camera and at least one further element in a fixed spatial-geometric relationship to the camera.

Advantageous further developments of the present invention are described below.

Exemplary embodiments of the present invention are explained in greater detail with reference to the figure and the description below.

BRIEF DESCRIPTION OF THE DRAWING

FIG. 1 shows a schematic and exemplary system overview for calibrating an interior camera of a vehicle.

DETAILED DESCRIPTION OF EXAMPLE EMBODIMENTS

FIG. 1 shows a schematic and exemplary system overview for calibrating an interior camera of a vehicle.

The system includes operating and/or display elements 100, 200, 300, 400, an interior camera 500 which records the face of a driver of the vehicle, and an electronic control unit 600 (ECU).

Elements 100, 200, 300, 400 communicate with control unit 600 via a vehicle bus system 900, e. g., a CAN bus. Examples of operating and/or display elements 100, 200, 300, 400 include a navigation system, an automotive audio system, side and rear view mirrors, an instrument display and a climate control panel.

The control unit includes a unit 610 for image processing, which is connected to interior camera 500 and ascertains head and eye positions in images of the camera as well as relative changes in the gaze direction based on changes in the head and eye positions.

In addition, the control unit includes a unit 620 for analyzing men-machine interface activity (HMI activity) on vehicle bus 900, e.g., within the framework of ACC column driving (automatic cruise control). For example, unit 620 may use driving maneuvers (such as turn signal activations, lane changes) to infer that a relative gaze direction change detected in camera images corresponds to a gaze of the driver into the rear view mirror or one of the side mirrors. Similarly, inputs into an audio system or a navigation system of the vehicle may lead to the conclusion that a relative gaze direction change detected in camera images corresponds to a gaze of the driver at the associated operating element or system.

A unit 630 synchronizes the changes in the gaze direction ascertained by unit 610 with the HMI activities determined by unit 620.

Further data 700 are utilized by a unit 640 in order to calculate absolute gaze directions from the gaze direction changes synchronized with the HMI activities. Further data 700, for example, encompass camera parameters from a band-end calibration of the camera and data for the spatial-geometric positioning of the operating elements in relation to an optical axis of the camera. The latter may come from CAD models of the vehicle, for instance.

A unit 650 finally ascertains an absolute gaze direction from two or more absolute gaze directions as ascertained by unit 640 and outputs a calibration parameter 800 of the gaze direction.

The units may be autonomous hardware components or software modules or software components. The control device is able to carry out additional tasks. For example, the control device may be part of the main unit (head unit) or the instrument cluster, the display device for the display of multiple parameters, e.g., the speed, rotational frequency, mileage and tank fill level.

The software modules or software components are able to be stored on a storage medium, that is to say, a CD, a DVD, a USB stick or a flash component or some other computer program product.

Operating elements 100, 200, 300, 400, for example, could be a navigation system, an automotive audio system or a climate control system.

If the driver, for instance, operates the automotive audio system or the navigation system and searches for a title or destination, this will be taken as an indication according to the invention that the driver, simultaneously with the search, will direct his gaze to a display on which selectable titles or navigation destinations are displayed. The head and eye position(s) in an image or in images synchronized with the operation may then be related to an absolute gaze direction, the absolute gaze direction resulting from the fixed relative spatial-geometric position of the display means in relation to the driver seat and the optical axis of the camera.

That is to say, an online calibration of the gaze direction change detection is possible, which utilizes the driver operations and/or driver interactions with elements inside or on the vehicle that are is a fixed spatial position relative to the camera for the calibration.

In one exemplary embodiment of the method of the present invention, a preliminary calibration of internal parameters of the camera is undertaken to begin with. This can include a band-end calibration, for example. Furthermore, the orientation and position of the camera in a vehicle-centered coordinate system is validated. Moreover, using CAD models of the vehicles, for instance, the spatial positions of the operating/display elements that may be utilized for calibrating the gaze direction change relative to the camera are ascertained.

Following the preliminary calibration, the image processing ascertains head and eye position in the image and, on that basis, a relative change in the gaze direction.

In parallel therewith, operating processes and actions are analyzed, such as steering maneuvers or turn signal activations of the driver.

If a relative change in the gaze direction takes place in a synchronized manner, i.e., at the same time, shortly before or shortly after an operation or action, this may lead to the conclusion that the relative change in the gaze direction has directed the driver's gaze to the element on which the operating process takes place or which is connected to the operating process. A relative change in the gaze direction that is synchronized with an input into an audio system or a navigation system is most likely directed toward the corresponding system. And a relative gaze direction change that is synchronized with an action initiating a lane change is probably directed toward a rear view mirror or a side mirror. It may similarly be assumed, for instance, that a relative change in the gaze direction which is synchronized with a warning signal on a display corresponds to a changed gaze of the driver in the direction of the display.

Based on the relative position of the associated element on which the operating process was executed, an associated absolute gaze direction is able to be ascertained.

Multiple absolute gaze directions may then be used for the general calibration of the gaze direction detection.

Although the present invention was illustrated and described in greater detail on the basis of preferred exemplary embodiments, the present invention is not restricted to the described examples; other variations may be derived by one skilled in the art without departing from the protective scope of the present invention.

What is claimed is:

1. A method for calibrating a camera for detecting an absolute gaze direction of a user in a vehicle, the method comprising:
    situating at least one operating element and/or display element in a fixed spatial-geometric relationship with the camera;

detecting, in images of the camera, at least one relative change in a gaze direction in which the user changes a gaze so as to gaze in a direction of the at least one operating and/or display element;

calibrating the camera by detecting, based on at least one action of the user, the at least one relative change in the gaze direction of the user; and synchronizing a video time stamp of the camera with at least one of an operating event and a display event of the at least one operating element and/or display element that triggers the action or is triggered by the action.

2. The method as recited in claim 1, further comprising:

detecting the absolute gaze direction while using the relative gaze direction change and the fixed spatial-geometric relationship.

3. The method as recited in claim 2, wherein camera parameters of the camera from a band-end calibration are utilized for ascertaining the absolute gaze direction.

4. The method as recited in claim 2, wherein multiple absolute gaze directions are ascertained, which are utilized for calibrating the gaze direction detection.

5. The method as recited in claim 2, wherein the calibrating includes ascertaining a head position and an eye position in an image recorded by the camera, and ascertaining the relative change in the gaze direction based on the ascertained head position and the ascertained eye position.

6. The method as recited in claim 1, wherein the at least one operating and/or display element includes at least one of a radio, an automotive navigation system, a climate control system, and the action includes at least one of an operation of a pushbutton, operation of a touch pad, and operation of a touch screen.

7. The method as recited in claim 1, wherein the at least one operating and/or display element includes at least one of a rear view mirror, and a screen, and the action includes a driving maneuver.

8. A device for calibrating a camera for detecting an absolute gaze direction of a user in a motor vehicle, comprising:

a camera;

at least one operating element and/or display element situated in a fixed spatial-geometric relationship with the camera; and a calibrating arrangement configured to detect, in images of the camera, at least one relative change in a gaze direction in which the user changes a gaze in a direction of the at least one element, and to provide calibrating of the camera by detecting, based on at least one action of the user, the at least one relative change in the gaze direction of the user, and to synchronize a video time stamp of the camera with at least one of an operating event and a display event of the at least one operating element and/or display element that triggers the action or is triggered by the action.

9. A non-transitory computer-readable storage device having a computer program, which is executable by a processor, comprising:

a program code arrangement having program code for calibrating a camera for detecting an absolute gaze direction of a user in a motor vehicle, by performing the following:

detecting, in images of the camera, at least one relative change in a gaze direction in which a user changes a gaze so as to gaze in a direction of the at least one operating element and/or display element situated in a fixed spatial-geometric relationship with the camera; and calibrating the camera by detecting, based on at least one action of the user, the at least one relative change in the gaze direction of the user; and synchronizing a video time stamp of the camera with at least one of an operating event and a display event of the at least one operating element and/or display element that triggers the action or is triggered by the action.

* * * * *